United States Patent
Kwon et al.

(10) Patent No.: US 9,040,189 B2
(45) Date of Patent: May 26, 2015

(54) CABLE-TYPE SECONDARY BATTERY AND PREPARATION THEREOF

(71) Applicant: LG Chem, Ltd., Seoul (KR)

(72) Inventors: Yo-Han Kwon, Daejeon (KR);
Byung-Hun Oh, Daejeon (KR);
Hye-Ran Jung, Daejeon (KR);
Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/479,856

(22) Filed: Sep. 8, 2014

(65) Prior Publication Data

US 2014/0377610 A1 Dec. 25, 2014

Related U.S. Application Data

(63) Continuation of application No. PCT/KR2014/004039, filed on May 7, 2014.

(30) Foreign Application Priority Data

May 7, 2013 (KR) .......... 10-2013-0051560
May 7, 2014 (KR) .......... 10-2014-0054273

(51) Int. Cl.
*H01M 6/10* (2006.01)
*H01M 10/0587* (2010.01)
(Continued)

(52) U.S. Cl.
CPC ...... *H01M 10/0587* (2013.01); *Y10T 29/49115* (2015.01); *H01M 2/14* (2013.01);
(Continued)

(58) Field of Classification Search
IPC .................................. H01M 10/0431
See application file for complete search history.

(56) References Cited

U.S. PATENT DOCUMENTS

| 4,522,897 A | 6/1985 | Walsh |
| 5,008,165 A | 4/1991 | Schmode |

(Continued)

FOREIGN PATENT DOCUMENTS

| JP | 11-297360 | 10/1999 |
| JP | 2005038612 A | 2/2005 |

(Continued)

OTHER PUBLICATIONS

International Search Report for Application No. PCT/KR2014/004039 dated Sep. 11, 2014.

(Continued)

*Primary Examiner* — Patrick Ryan
*Assistant Examiner* — Lucas J O'Donnell
(74) *Attorney, Agent, or Firm* — Lerner, David, Littenberg, Krumholz & Mentlik, LLP

(57) ABSTRACT

The present disclosure provides a cable-type secondary battery, comprising: an inner electrode; and a sheet-form laminate of separation layer-outer electrode, spirally wound to surround the outer surface of the inner electrode, the laminate being formed by carrying out compression for the integration of a separation layer for preventing a short circuit, and an outer electrode.

According to the present disclosure, the electrodes and the separation layer are compressed and integrated to minimize ununiform spaces between the separation layer and the outer electrode and reduce the thickness of a battery to be prepared, thereby decreasing resistance and improving ionic conductivity within the battery. Also, the separation layer coming into contact with the electrodes absorbs an electrolyte solution to induce the uniform supply of the electrolyte solution into the outer electrode active material layer, thereby enhancing the stability and performances of the cable-type secondary battery.

13 Claims, 4 Drawing Sheets

(51) Int. Cl.

| | | |
|---|---|---|
| *H01M 2/14* | (2006.01) | |
| *H01M 4/02* | (2006.01) | |
| *H01M 4/13* | (2010.01) | |
| *H01M 4/64* | (2006.01) | |
| *H01M 10/04* | (2006.01) | |
| *H01M 10/058* | (2010.01) | |
| *H01M 10/0525* | (2010.01) | |
| *H01M 10/0565* | (2010.01) | |
| *H01M 10/0567* | (2010.01) | |
| *H01M 10/0569* | (2010.01) | |
| *H01M 2/16* | (2006.01) | |
| *H01M 4/485* | (2010.01) | |
| *H01M 4/62* | (2006.01) | |
| *H01M 4/66* | (2006.01) | |
| *H01M 4/74* | (2006.01) | |

(52) U.S. Cl.
CPC ............ *H01M 4/02* (2013.01); *H01M 4/13* (2013.01); *H01M 4/64* (2013.01); *H01M 10/04* (2013.01); *H01M 10/058* (2013.01); *H01M 10/0431* (2013.01); *H01M 10/0525* (2013.01); *H01M 10/0565* (2013.01); *H01M 2220/30* (2013.01); *H01M 2300/0082* (2013.01); *H01M 2300/0085* (2013.01); *H01M 10/0567* (2013.01); *H01M 10/0569* (2013.01); *H01M 2300/0037* (2013.01); *H01M 2/1653* (2013.01); *H01M 4/485* (2013.01); *H01M 4/623* (2013.01); *H01M 4/624* (2013.01); *H01M 4/66* (2013.01); *H01M 4/74* (2013.01); *H01M 2220/20* (2013.01); *Y02E 60/122* (2013.01)

(56) References Cited

U.S. PATENT DOCUMENTS

| | | | |
|---|---|---|---|
| 5,077,153 A | 12/1991 | Grange-Cossou et al. | |
| 6,280,879 B1 | 8/2001 | Andersen et al. | |
| 6,403,263 B1 | 6/2002 | Roach | |
| 6,723,467 B2 | 4/2004 | Yoshida et al. | |
| 7,682,740 B2 | 3/2010 | Yong et al. | |
| 2001/0053475 A1 | 12/2001 | Ying et al. | |
| 2003/0215716 A1 | 11/2003 | Suzuki et al. | |
| 2005/0112461 A1 | 5/2005 | Amine et al. | |
| 2005/0118508 A1 | 6/2005 | Yong et al. | |
| 2005/0155216 A1 | 7/2005 | Cho et al. | |
| 2006/0008702 A1 | 1/2006 | Cheon et al. | |
| 2006/0110661 A1 | 5/2006 | Lee et al. | |
| 2006/0199294 A1 | 9/2006 | Fujikawa et al. | |
| 2007/0207379 A1 | 9/2007 | Hatta et al. | |
| 2008/0032170 A1 | 2/2008 | Wainright et al. | |
| 2008/0089006 A1 | 4/2008 | Zhong et al. | |
| 2009/0107746 A1 | 4/2009 | Horie et al. | |
| 2010/0261065 A1 | 10/2010 | Babinec et al. | |
| 2010/0273051 A1 | 10/2010 | Choi et al. | |
| 2010/0291442 A1 | 11/2010 | Wang et al. | |
| 2011/0111277 A1 | 5/2011 | Bessho et al. | |
| 2012/0009331 A1 | 1/2012 | Kwon et al. | |
| 2012/0034509 A1 | 2/2012 | Bae et al. | |
| 2012/0040235 A1 | 2/2012 | Cho et al. | |
| 2012/0077109 A1 | 3/2012 | Hong et al. | |
| 2012/0100412 A1 | 4/2012 | Kwon et al. | |
| 2012/0107658 A1* | 5/2012 | Kwon et al. | 429/94 |
| 2012/0115040 A1 | 5/2012 | Kwon et al. | |
| 2012/0141877 A1 | 6/2012 | Choi et al. | |
| 2012/0189914 A1 | 7/2012 | Hara et al. | |
| 2012/0295144 A1 | 11/2012 | Kwon et al. | |
| 2013/0011742 A1 | 1/2013 | Park et al. | |
| 2013/0143126 A1 | 6/2013 | Jung et al. | |
| 2013/0288150 A1 | 10/2013 | Hodges et al. | |
| 2013/0344363 A1* | 12/2013 | Upadhyaya | 429/94 |
| 2013/0344368 A1 | 12/2013 | Kwon et al. | |
| 2014/0011065 A1 | 1/2014 | Kwon et al. | |
| 2014/0170454 A1 | 6/2014 | Kwon et al. | |
| 2014/0178726 A1 | 6/2014 | Kwon et al. | |
| 2014/0186672 A1 | 7/2014 | Kwon et al. | |
| 2014/0186673 A1 | 7/2014 | Kwon et al. | |
| 2014/0212720 A1 | 7/2014 | Kwon et al. | |
| 2014/0234681 A1 | 8/2014 | Kwon et al. | |
| 2014/0370351 A1 | 12/2014 | Kwon et al. | |

FOREIGN PATENT DOCUMENTS

| | | |
|---|---|---|
| JP | 2007265989 A | 10/2007 |
| JP | 2011054502 A | 3/2011 |
| KR | 20050043674 A | 5/2005 |
| KR | 20050075811 A | 7/2005 |
| KR | 10-0582557 B1 | 5/2006 |
| KR | 2008-0005627 A | 1/2008 |
| KR | 20080010166 A | 1/2008 |
| KR | 20080015373 A | 2/2008 |
| KR | 20100117403 A | 11/2010 |
| KR | 20100130818 A | 12/2010 |
| KR | 20110038038 A | 4/2011 |
| KR | 20110136448 A | 12/2011 |
| KR | 20120000708 A | 1/2012 |
| KR | 20120014542 A | 2/2012 |
| KR | 20120094871 A | 8/2012 |
| KR | 2013-0040160 A | 4/2013 |
| KR | 20130040166 A | 4/2013 |
| KR | 20130045219 A | 5/2013 |
| WO | 2005098994 A1 | 10/2005 |
| WO | 2011159083 A2 | 12/2011 |
| WO | 2012088643 A1 | 7/2012 |

OTHER PUBLICATIONS

International Search Report for Application No. PCT/KR2014/004042 dated Sep. 11, 2014.
International Search Report for Application No. PCT/KR2014/004043 dated Sep. 11, 2014.
International Search Report for Application No. PCT/KR2014/004044 dated Oct. 1, 2014.
International Search Report for Application No. PCT/KR2014/004046 dated Oct. 1, 2014.
International Search Report for Application No. PCT/KR2014/004048 dated Sep. 12, 2014.
International Search Report from PCT/KR2014/003737, dated Aug. 14, 2014.
International Search Report from PCT/KR2014/004047, dated Sep. 3, 2014.
Machine Enlish Translation of JP 2005-038612.
Original Japanese text of JP 2005-038612.
U.S. Appl. No. 14/445,144, filed Jul. 29, 2014.
U.S. Appl. No. 14/472,635, filed Aug. 29, 2014.
U.S. Appl. No. 14/472,692, filed Aug. 29, 2014.
U.S. Appl. No. 14/477,305, filed Sep. 4, 2014.
U.S. Appl. No. 14/477,317, filed Sep. 4, 2014.
U.S. Appl. No. 14/479,713, filed Sep. 8, 2014.
U.S. Appl. No. 14/479,821, filed Sep. 8, 2014.
U.S. Appl. No. 14/480,914, filed Sep. 9, 2014.
U.S. Appl. No. 14/480,919, filed Sep. 9, 2014.
U.S. Appl. No. 14/480,926, filed Sep. 9, 2014.
U.S. Appl. No. 14/483,318, filed Sep. 11, 2014.
U.S. Appl. No. 14/483,328, filed Sep. 11, 2014.
U.S. Appl. No. 14/483,348, filed Sep. 11, 2014.
U.S. Appl. No. 14/483,373, filed Sep. 11, 2014.
U.S. Appl. No. 14/484,401, filed Sep. 12, 2014.
U.S. Appl. No. 14/484,454, filed Sep. 12, 2014.
U.S. Appl. No. 14/484,463, filed Sep. 12, 2014.
U.S. Appl. No. 14/484,472, filed Sep. 12, 2014.
U.S. Appl. No. 14/484,487, filed Sep. 12, 2014.
Y.H. Kwon, S.-W. Woo, H.-R. Jung, H.K. Yu, K. Kim, B.H. Oh, S. Ahn, S.-Y. Lee, S.-Wan Song, J. Cho, H.-C. Shin, J. Y. Kim, Cable-Type Flexible Lithium Ion Battery Based on Hollow Multi-Helix Electrodes, Adv. Mater. 2012, 24, 5192-5197.

* cited by examiner

CABLE-TYPE SECONDARY BATTERY AND PREPARATION THEREOF

CROSS-REFERENCE TO RELATED APPLICATION

This application is a continuation of International Application No. PCT/KR2014/004039 filed on May 7, 2014, which claims priority under 35 USC 119(a) to Korean Patent Application No. 10-2013-0051560 filed in the Republic of Korea on May 7, 2013, and Korean Patent Application No. 10-2014-0054273 filed in the Republic of Korea on May 7, 2014, the disclosures of which are incorporated herein by reference.

TECHNICAL FIELD

The present disclosure relates to a cable-type secondary battery which can freely change in shape, and more specifically to a cable-type secondary battery constructed to comprise a laminate of separation layer-outer electrode which is integrated by adhering a separation layer and an outer electrode with each other, and a method of preparing the cable-type secondary battery.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop cable-type batteries having a very high ratio of length to cross-sectional diameter. Korean Patent Application publication No. 2005-99903 discloses a flexible battery consisting of an inner electrode, an outer electrode and an electrolyte layer interposed therebetween. However, such battery has poor flexibility. The linear batteries use a polymer electrolyte to form an electrolyte layer, but this causes difficulties in the inflow of the electrolyte into an electrode active material, thereby increasing the resistance of the batteries and deteriorating the capacity and cycle characteristics thereof.

Also, the cable-type batteries may have spaces that are ununiformly generated among a separation layer interposed between an inner electrode and an outer electrode and such electrodes in the preparation thereof, and such a space may disturb the introduction of an electrolyte solution in an outer electrode active material layer, thereby deteriorating battery performances.

SUMMARY OF THE DISCLOSURE

The present disclosure is designed to solve the problems of the related art, and therefore the present disclosure is directed to providing a secondary battery having a new linear structure, which is obtained by compressing a separation layer and an outer electrode for the integration thereof to minimize ununiform spaces between the separation layer and the outer electrode and allow for the separation layer coming into contact with the outer electrode to absorb an electrolyte solution, thereby inducing the uniform supply of the electrolyte solution into the outer electrode active material layer, and eventually achieving easy change in shape, excellent stability and good performances as a secondary battery.

In accordance with one aspect of the present disclosure, there is provided a cable-type secondary battery, comprising an inner electrode; and a sheet-form laminate of separation layer-outer electrode, spirally wound to surround the outer surface of the inner electrode, the laminate being formed by carrying out compression for the integration of a separation layer for preventing a short circuit, and an outer electrode.

At this time, the sheet-form laminate of separation layer-outer electrode may have a strip structure extending in one direction.

In addition, the sheet-form laminate of separation layer-outer electrode may be spirally wound so that it is not overlapped in its width or so that it is overlapped.

In addition, the laminate of separation layer-outer electrode may be formed by maintaining a peel strength of 15 to 300 N/m between the separation layer and the outer electrode during compression for the integration thereof.

At this time, the outer electrode may comprise an outer current collector and an outer electrode active material layer formed on one surface of the outer current collector.

In the laminate of separation layer-outer electrode, the separation layer and the outer electrode active material layer may come into contact with each other.

Also, the laminate of separation layer-outer electrode may further comprise a polymer film formed on another surface of the outer current collector.

The polymer film may be made of any one selected from the group consisting of polyolefin, polyester, polyimide, polyamide and a mixture thereof.

The outer current collector may be in the form of a mesh.

In the present disclosure, the separation layer may have a size larger than that of the outer current collector in the width and the length thereof.

Also, the outer current collector may further comprise a primer coating layer consisting of a conductive material and a binder.

At this time, the conductive material may comprise any one selected from the group consisting of carbon black, acetylene black, ketjen black, carbon fiber, carbon nanotube, graphene and a mixture thereof.

In addition, the binder may be selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

In addition, the outer current collector may have a plurality of recesses on at least one surface thereof.

The plurality of recesses may be continuously patterned or intermittently patterned.

The outer current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube.

At this time, the conductive material may be selected from the group consisting of polyacetylene, polyaniline, polypyrrole, polythiophene, polysulfurnitride, indium tin oxide (ITO), silver, palladium, nickel and a mixture thereof.

In addition, the conductive polymer may be selected from the group consisting of polyacetylene, polyaniline, polypyrrole, polythiophene, polysulfurnitride and a mixture thereof.

Meanwhile, the inner electrode may include at least one inner current collector and an inner electrode active material layer formed on one surface of the inner current collector.

Here, the inner current collector may further comprise a primer coating layer consisting of a conductive material and a binder.

In addition, a plurality of recesses may be formed on at least one surface of the inner current collector. The plurality of recesses are continuously patterned or intermittently patterned.

Meanwhile, the inner electrode may have a structure that the inner electrode active material layer is formed on the whole surface of the inner current collector, or a structure that the inner electrode active material layer is formed to surround the outer surface of the wound inner current collector.

In addition, the inner electrode may further comprise a polymer supporting layer formed on the surface of the inner electrode active material layer.

At this time, the polymer supporting layer may be a porous layer having a pore size of 0.01 to 10 μm and a porosity of 5 to 95%.

In addition, the polymer supporting layer may comprise a linear polymer with polarity, an oxide-based linear polymer or a mixture thereof.

At this time, the linear polymer with polarity may be selected from the group consisting of polyacrylonitrile, polyvinyl chloride, polyvinylidene fluoride (PVDF), polyvinylidene fluoride-co-hexafluoro propylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate, poly-p-phenylene terephthalamide and a mixture thereof.

In addition, the oxide-based linear polymer may be selected from the group consisting of polyethylene oxide, polypropylene oxide, polyoxymethylene, polydimethylsiloxane and a mixture thereof.

In addition, the inner current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

At this time, the conductive material may be selected from the group consisting of polyacetylene, polyaniline, polypyrrole, polythiophene, polysulfurnitride, indium tin oxide (ITO), silver, palladium, nickel and a mixture thereof.

In addition, the conductive polymer may be selected from the group consisting of polyacetylene, polyaniline, polypyrrole, polythiophene, polysulfurnitride and a mixture thereof.

Meanwhile, the inner electrode may be a hollow structure whose central part is empty.

At this time, the inner electrode may comprise one or more wire-form inner current collectors being spirally wound or one or more sheet-form inner current collectors being spirally wound. The inner electrode may comprise two or more wire-form inner current collectors being spirally crossed with each other.

In addition, the inner electrode may be provided with a core of inner current collector, a core for supplying lithium ions, which comprises an electrolyte, or a filling core therein.

At this time, the core for supplying lithium ions may comprise a gel polymer electrolyte and a support and may further comprise a liquid electrolyte and a porous carrier. Meanwhile, the electrolyte which is used in the core for supplying lithium ions may be selected from a non-aqueous electrolyte solution using ethylene carbonate (EC), propylene carbonate (PC), butylenes carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

The electrolyte may further comprise a lithium salt.

At this time, the lithium salt may be selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

Meanwhile, the inner electrode may be an anode or a cathode, and the outer electrode may be a cathode or an anode corresponding to the inner electrode.

When the inner electrode is an anode and the outer electrode is a cathode, the inner electrode active material may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof, and the outer electrode active material may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x<0.5$, $0 \leq y<0.5$, $0 \leq z<0.5$, and $x+y+z \leq 1$), and a mixture thereof.

Alternatively, when the inner electrode is a cathode and the outer electrode is an anode, the inner electrode active material may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x<0.5$, $0 \leq y<0.5$, $0 \leq z<0.5$, and $x+y+z \leq 1$), and a mixture thereof, and the outer electrode active material may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof.

Meanwhile, the separation layer may be an electrolyte layer or a separator.

The electrolyte layer may comprise an electrolyte selected from a gel polymer electrolyte using PEO, PVdF, PMMA, PVdF-HFP, PAN, or PVAc; and a solid electrolyte using PEO, polypropylene oxide (PPO), polyether imine (PEI), polyethylene sulphide (PES), or polyvinyl acetate (PVAc).

The electrolyte layer may further comprise a lithium salt.

At this time, the lithium salt may be selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

The separator may be a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; a porous substrate made of a mixture of inorganic particles and a binder polymer; or a separator having a porous coating layer formed on at least one surface of the porous polymer substrate and comprising inorganic particles and a binder polymer.

At this time, the porous polymer substrate may be a porous polymer film substrate or a porous non-woven fabric substrate.

Meanwhile, the cable-type secondary battery may further comprise a protection coating surrounding the outer surface of the laminate of separation layer-outer electrode.

Here, the protection coating may be made of a polymer resin.

At this time, the polymer resin may comprise any one selected from the group consisting of PET, PVC, HDPE, an epoxy resin and a mixture thereof.

In addition, the protection coating may further comprise a moisture-blocking layer.

At this time, the moisture-blocking layer may be made of aluminum or a liquid-crystalline polymer.

In accordance with another aspect of the present invention, there is provided a cable-type secondary battery, comprising: a core for supplying lithium ions, which comprises an electrolyte; an inner electrode having one or more wire-form inner current collectors wound to surround the outer surface of the core for supplying lithium ions and an inner electrode active material layer formed on the surface of the wire-form inner current collectors; and a sheet-form laminate of separation layer-outer electrode, spirally wound to surround the outer surface of the inner electrode, the laminate being formed by carrying out compression for the integration of a separation layer for preventing a short circuit, and an outer electrode having an outer current collector and an outer electrode active material layer formed on one surface of the outer current collector.

In accordance with another aspect of the present invention, there is provided a cable-type secondary battery, comprising: two or more inner electrodes arranged in parallel to each other; and a sheet-form laminate of separation layer-outer electrode, spirally wound to surround the outer surface of the inner electrode, the laminate being formed by carrying out compression for the integration of a separation layer for preventing a short circuit, and an outer electrode.

In accordance with another aspect of the present invention, there is provided a cable-type secondary battery, comprising: two or more cores for supplying lithium ions, which comprise an electrolyte; two or more inner electrodes arranged in parallel to each other, each inner electrode having one or more inner current collectors spirally wound to surround the outer surface of each core for supplying lithium ions and an inner electrode active material layer formed on the surface of the inner current collectors; and a sheet-form laminate of separation layer-outer electrode, formed on the outer surface of the inner electrode, the laminate being formed by carrying out compression for the integration of a separation layer for preventing a short circuit, and an outer electrode having an outer current collector and an outer electrode active material layer formed on one surface of the outer current collector.

In addition, in accordance with still another aspect of the present invention, there is provided a method of preparing a cable-type secondary battery, comprising (S1) winding a wire-form inner current collector together with an inner electrode active material layer formed on the surface of the inner current collector to obtain a hollow inner electrode whose central part is empty; (S2) compressing a sheet of a separation layer for preventing a short circuit with a sheet of an outer electrode having an outer current collector and an outer electrode active material layer formed on one surface of the outer current collector for the integration thereof to obtain a laminate of separation layer-outer electrode; (S3) spirally winding the laminate of separation layer-outer electrode on the outer surface of the inner electrode to obtain an electrode assembly; (S4) forming a protection coating on the outer surface of the electrode assembly; and (S5) introducing an electrolyte solution in the empty central part of the inner electrode to form a core for supplying lithium ions.

Further, in accordance with yet still another aspect of the present invention, there is provided a method of preparing a cable-type secondary battery, comprising (S1) forming a core for supplying lithium ions; (S2) winding a wire-form inner current collector together with an inner electrode active material layer formed on the surface of the inner current collector, on the outer surface of the core for supplying lithium ions, to obtain an inner electrode; (S3) compressing a sheet of a separation layer for preventing a short circuit with a sheet of an outer electrode having an outer current collector and an outer electrode active material layer formed on one surface of the outer current collector for the integration thereof to obtain a laminate of separation layer-outer electrode; (S4) spirally winding the laminate of separation layer-outer electrode on the outer surface of the inner electrode to obtain an electrode assembly; and (S5) forming a protection coating on the outer surface of the electrode assembly.

Thus, according to the present disclosure, the electrodes and the separation layer are adhered and integrated to minimize ununiform spaces between the separation layer and the outer electrode and reduce the thickness of a battery to be prepared, thereby decreasing resistance and improving ionic conductivity within the battery.

Also, the separation layer coming into contact with the electrodes absorbs an electrolyte solution to induce the uniform supply of the electrolyte solution into the outer electrode active material layer, thereby enhancing the stability and performances of the cable-type secondary battery.

BRIEF DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

<Explanation of Reference Numerals>

Figure 1:
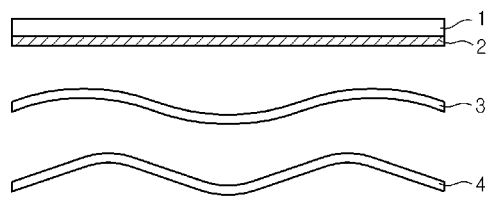
FIG. 1 schematically shows a cross-section of a cable-type secondary battery having a conventional inner current collector, in which an inner electrode, a separation layer and an outer electrode are shown.
Figure 2:
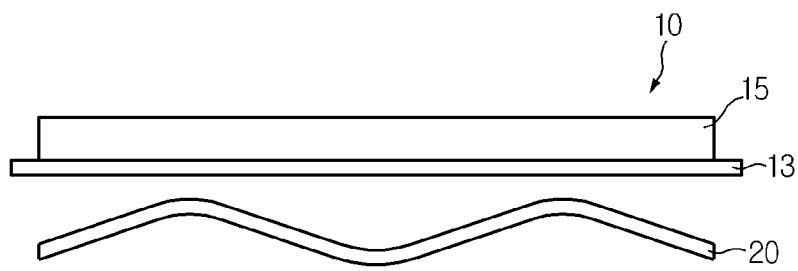
FIGS. 2 and 3 schematically show a cross-section of a cable-type secondary battery according to an embodiment of the present disclosure, in which an inner electrode and a laminate of separation layer-outer electrode are shown.
Figure 3:
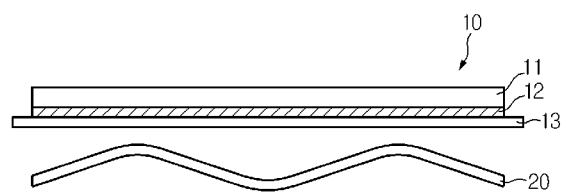

| 1, 11: Outer current collector | 2, 12: Outer electrode active material layer |
|---|---|
| 3, 13: Separation layer | 4, 20: Inner electrode |
| 10: Laminate of separation layer-outer electrode | |
| 15: Outer electrode | |
| 100, 200, 300, 400: Cable-type secondary battery | |
| 110, 210, 310, 410: Core for supplying lithium ions | |
| 120, 220, 320, 420: Wire-form Inner current collector | |
| 130, 230, 330, 430: Inner electrode active material layer | |
| 140, 240, 340, 440: Laminate of separation layer-outer electrode | |
| 150, 250, 350, 450: Protection coating | |

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Conventional cable-type secondary batteries have an electrolyte layer which is interposed between an inner electrode and an outer electrode. In order for the electrolyte layer to isolate the inner electrode from the outer electrode and prevent a short circuit, the electrolyte layer is required to be made of gel-type polymer electrolytes or solid polymer electrolytes having a certain degree of mechanical properties. However, such gel-type polymer electrolytes or solid polymer electrolytes fail to provide superior performances as a source for lithium ions, so an electrolyte layer made of such should have an increased thickness so as to sufficiently provide lithium ions. Such a thickness increase in the electrolyte layer widens an interval between the electrodes to cause resistance increase, thereby deteriorating battery performances.

In order to solve this problem, there is an attempt to provide a core supplying lithium ion and comprising a lithium salt within an inner electrode supporter having an open structure, so that the electrolyte of the core for supplying lithium ions can pass through the inner electrode supporter to reach an inner electrode active material layer and an outer electrode active material layer.

Referring to FIGS. 1 to 8, in the case of conventional secondary batteries having an open-structured inner current collector 4, owing to the uneven parts of the inner current collector 4, there are spaces between a separation layer 3 and an outer electrode 1, 2. In this case, the spaces between a separation layer 3 and an outer electrode 1, 2 may disturb the introduction of an electrolyte solution in the outer electrode active material layer 2. For this reason, secondary batteries have exhibited ununiform discharging behaviors, making it difficult to achieve the desired battery performances.

Accordingly, the present inventors have endeavored to solve such a problem and the problem has overcome by providing a laminate 10 consisting of an outer electrode 15 and a separation layer 13 being integrated by pre-adhesion in the batteries so as to uniformly maintain spaces between the outer electrode 15 and the separation layer 13, thereby allowing for the separation layer 13 coming into contact with the outer electrode active material layer 12 to absorb an electrolyte solution from the inner electrode 20 and induce the uniform supply of the electrolyte solution into the outer electrode active material layer 12.

In other words, the cable-type secondary battery according to the present disclosure includes an inner electrode; and a sheet-form laminate of separation layer-outer electrode, spirally wound to surround the outer surface of the inner electrode, the laminate being formed by carrying out compression for the integration of a separation layer for preventing a short circuit, and an outer electrode.

Here, the term 'spirally' used herein refers to represent a helix shape that turns around at a certain area while moving, including general spring forms.

At this time, the sheet-form laminate of separation layer-outer electrode may have a strip structure extending in one direction.

In addition, the sheet-form laminate of separation layer-outer electrode may be spirally wound so that it is not overlapped in its width. At this time, the sheet-form laminate of separation layer-outer electrode may be spirally wound with space within the double length of its width so that it is not overlapped, in order to prevent the performance of the battery from deteriorating.

In addition, the sheet-form laminate of separation layer-outer electrode may be spirally wound so that so that it is overlapped in its width. At this time, the sheet-form laminate of separation layer-outer electrode may be spirally wound so that the width of its overlapped part is within 0.9 folds of the width of the sheet-form laminate of separation layer-outer electrode, in order to suppress excessive increase of an internal resistance of the battery.

Moreover, the outer electrode may comprise an outer current collector and an outer electrode active material layer formed on one surface of the outer current collector.

Meanwhile, the laminate 10 of separation layer-outer electrode may be integrated by adhesion, for example the laminate 10 of separation layer-outer electrode may be formed by adhering and integrating the separation layer 13 and the outer electrode 15 through a lamination process by way of roll press.

When the electrode active material layer comprises a binder and the separation layer is a separator comprising the binder and inorganic mixture, the binder of the electrode active material layer or the binder release from the separator may provide stronger adhesiveness in an interface between the separation layer and the electrodes.

In the present disclosure, the laminate 10 of separation layer-outer electrode may be formed by maintaining a peel strength of 15 to 300 N/m between the separation layer 13 and the outer electrode 15 during compression for the integration thereof. When the peel strength satisfies such a range, an adequate adhesiveness between the separation layer and the outer electrode can be obtained without separation thereof, thereby achieving good integration of the separation layer and the outer electrode.

Meanwhile, the separation layer 13 may be designed to have a size larger than that the outer electrode 15 in the width and the length thereof when it wound on the inner electrode 20, thereby preventing a short circuit between the outer electrode 15 and the inner electrode 20. More specifically, a width difference (w1) and a length difference (w2) between the separation layer 13 and the outer electrode may each be 0.1 mm or more.

Also, in the laminate 10 of separation layer-outer electrode, the separation layer 13 and the outer electrode active material layer 12 may come into contact with each other.

In addition, although not shown in the drawings, the laminate 10 of separation layer-outer electrode may further comprise a polymer film on another surface of the outer electrode 11 in which the outer electrode active material layer 12 is not formed.

Such a polymer film can prevent a short circuit between electrodes from stress such as external bending or twisting when the outer current collector is made of a metal in the form of a sheet, thereby improving the flexibility of the cable-type secondary battery. The polymer film may be made of any one selected from the group consisting of polyolefin, polyester, polyimide, polyamide and a mixture thereof, but is not limited thereto.

In conventional cable-type secondary batteries provided with a separation layer, a sheet-form separation layer is generally formed by winding on the outer surface of an inner electrode, and at this time, both boundaries of the separation layer may be overlapped with each other, so overlapped areas and non-overlapped areas may be present in the separation layer.

If the separation layer is wound without overlapping in both boundaries thereof, the boundaries of the separation layer may be detached when the cable-type secondary batteries are bent or twisted, from which the inner electrode may come into contact with the outer electrode to cause a short circuit. For the purpose of preventing this problem, if the separation layer is wound so that both boundaries thereof are overlapped, the thickness of the separation layer becomes increased to cause other problems, for example, the ionic conductivity of batteries may be reduced.

In contrast, the present invention uses the laminate 10 of the separation layer 13 and the outer electrode 15 being integrated by pre-adhesion. That is, such a laminate can be used in a cable-type battery to prevent an internal short circuit due to the contact of an inner electrode and an outer electrode because the separation layer and the outer electrode can integrally move even though the cable-type battery is bent. As a result, the flexibility of the battery can be enhanced and the separation layer is minimized from overlapping in both boundaries thereof, thereby providing good ionic conductivity and contributing to the improvement of battery performances.

Furthermore, since the separation layer and the outer electrode are integrated according to the present disclosure, the separation layer can acts as a buffer against external stress applied to an electrode active material layer, thereby preventing the release of an outer electrode active material from the outer current collector even though extreme bending stress is applied to the outer electrode.

Meanwhile, when cable-type secondary batteries are subject to external forces by bending or twisting, an electrode active material layer may be released from a current collector. For this reason, large amounts of binder components are used in the electrode active material layer so as to provide flexibility in electrodes. However, large amounts of binder may be easily peeled off owing to swelling by an electrolyte solution, thereby deteriorating battery performances.

Accordingly, for the purpose of improving adhesiveness between an electrode active material layer and a current collector, at least one of the inner current collector and the outer current collector may further comprise a primer coating layer consisting of a conductive material and a binder.

At this time, the conductive material used in the conductive layer may comprise any one selected from the group consisting of carbon black, acetylene black, ketjen black, carbon fiber, carbon nanotube, graphene and a mixture thereof.

In addition, the binder may be selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

Also, the inner current collector and the outer current collector may have a plurality of recesses on at least one surface thereof so as to more increase its surface area. The recesses may be continuously patterned or intermittently patterned. That is, continuous patterned recesses may be formed with spacing apart with each other in the longitudinal direction, or a plurality of holes may be formed in the form of intermittent patterns. The plurality of holes may be a circular or polygonal shape.

Meanwhile, the inner electrode may be a hollow structure whose central part is empty.

At this time, the inner current collector comprised in the inner electrode may be one or more wires being spirally wound or one or more sheets being spirally wound.

In addition, the inner current collector may be two or more wires being spirally crossed with each other.

In addition, the inner electrode may be provided with a core of the inner current collector therein.

At this time, the core of inner current collector may be made of carbon nanotube, stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer.

In addition, the inner electrode may be provided with a core for supplying lithium ions, which comprises an electrolyte therein.

At this time, the core for supplying lithium ions may comprise a gel polymer electrolyte and a support.

Also, the core for supplying lithium ions may comprise a liquid electrolyte and a porous carrier.

In addition, the inner electrode may be provided with a filling core therein.

The filling core may be made of several materials for improving various performances of cable-type batteries, for example polymer resins, rubber and inorganics, besides materials forming the core of inner current collector and the core for supplying lithium ions, and also may have various forms including wire, fiber, powder, mesh and foam.

Meanwhile, a cable-type secondary battery 100, 200, 300 according to one embodiment of the present disclosure comprises a core 110, 210, 310 for supplying lithium ions, which comprises an electrolyte; an inner electrode, comprising one or more inner current collector 120, 220, 320 which is wound to surround the outer surface of the core 110, 210, 310 for supplying lithium ions, and an inner electrode active material layer 130, 230, 330 formed on the surface of the inner current collector 120, 220, 320; a sheet-form laminate 140, 240, 340 of separation layer-outer electrode, spirally wound to surround the outer surface of the inner electrode, the laminate being formed by carrying out compression for the integration of a separation layer for preventing a short circuit, and an outer electrode having an outer current collector and an outer electrode active material layer formed on one surface of the outer current collector.

The cable-type secondary battery of the present disclosure has a horizontal cross section of a predetermined shape, a linear structure, which extends in the longitudinal direction, and flexibility, so it can freely change in shape. The term 'a predetermined shape' used herein is not limited to any particular shape, and refers to any shape that does not damage the nature of the present disclosure.

The inner electrode may have a structure that the inner electrode active material layer is formed on the whole surface of the inner current collector, or a structure that the inner electrode active material layer is formed to surround the outer surface of the inner current collector.

Figure 4:
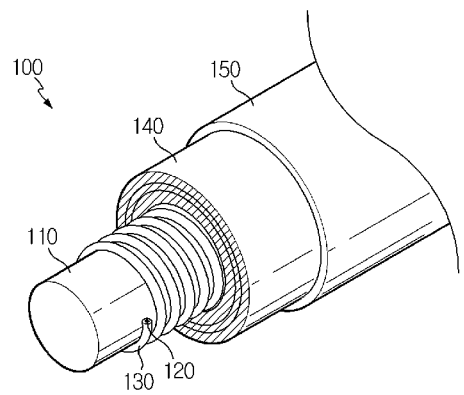
FIG. 4 schematically shows a cable-type secondary battery having one wire-form inner current collector being wound, according to an embodiment of the present disclosure.
Figure 5:
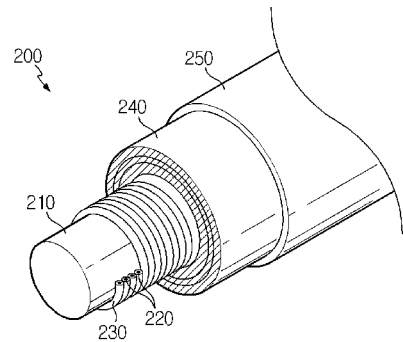
FIG. 5 schematically shows a cable-type secondary battery having two wire-form inner current collectors being wound, according to an embodiment of the present disclosure.

For the structure that the inner electrode active material layer is formed on the whole surface of the wire-form inner current collector, in the case shown in FIG. 4, the inner electrode active material layer 130 may be formed on the surface of one wire-form inner current collector 120 before the wire-form inner current collector 120 is wound on the outer surface of the core 110 for supplying lithium ions, and in the case shown in FIG. 5, the inner electrode active material layer 230 may be formed on the surface of two or more wire-form inner current collectors 220 and then two or more wire-form inner current collectors 220 may be together wound while crossing with each other, which is favorable in the improvement of battery rate characteristics.

Figure 6:
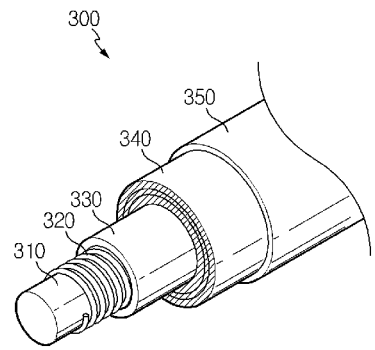
FIG. 6 schematically shows a cable-type secondary battery having one wire-form inner current collector being wound, according to another embodiment of the present disclosure.
Figure 7:
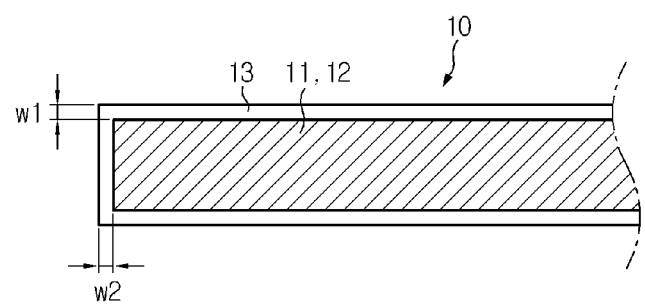
FIG. 7 shows a laminate of separation layer-outer electrode according to an embodiment of the present disclosure.
Figure 8:
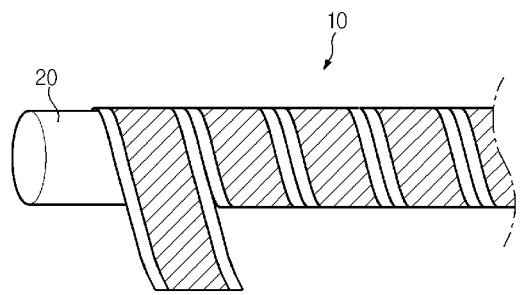
FIG. 8 schematically shows a sheet-form laminate of separation layer-outer electrode wound on the outer surface of an inner electrode, according to an embodiment of the present disclosure.

For structure that the inner electrode active material layer is formed to surround the outer surface of the wound wire-form inner current collector, in the case shown in FIG. 6, a wire-form inner current collector 320 may be wound on the outer surface of a core 310 for supplying lithium ions, and then an inner electrode active material layer 330 is formed to surround the wound wire-form inner current collector 320.

Also, the inner electrode may further comprise a polymer supporting layer formed on the surface of the inner electrode active material layer.

In the case that the inner electrode active material layer further comprises a polymer supporting layer on the surface thereof, in accordance with one embodiment of the present disclosure, although the inner electrode is in the form of a wound wire, it is possible to prevent crack occurrence even when the cable-type secondary battery is bent by external force. Thereby, the release of the inner electrode active material layer can be prevented to minimize the deterioration of battery performances. Furthermore, the polymer supporting layer may have a porous structure which allows good introduction of an electrolyte solution in the inner electrode active material layer, thereby preventing an electrode resistance rise.

In the present disclosure, the polymer supporting layer may comprise a linear polymer with polarity, an oxide-based linear polymer or a mixture thereof.

The linear polymer with polarity may be selected from the group consisting of polyacrylonitrile, polyvinyl chloride, polyvinylidene fluoride (PVDF), polyvinylidene fluoride-co-hexafluoro propylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate, poly-p-phenylene terephthalamide and a mixture thereof.

The oxide-based linear polymer may be selected from the group consisting of polyethylene oxide, polypropylene oxide, polyoxymethylene, polydimethylsiloxane and a mixture thereof.

Also, the polymer supporting layer may be a porous layer having a pore size of 0.01 to 10 μm and a porosity of 5 to 95%.

Such a porous structure of the polymer supporting layer may be formed by phase separation or phase change using a non-solvent during its preparation.

For example, polyvinylidene fluoride-co-hexafluoro propylene as a polymer is added to acetone used as a solvent to obtain a solution having 10 wt % of solids. To the solution obtained, water or ethanol as a non-solvent is added in an amount of 2 to 10 wt % to form phase-separated parts of the non-solvent and the polymer.

Among these, the parts of the non-solvent become pores. Accordingly, the size of pores can be controlled depending on the solubility of the non-solvent and the polymer and the amount of the non-solvent.

In the present disclosure, the wire-form inner current collector 120, 220, 320 is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

Such a current collector serves to collect electrons generated by electrochemical reaction of the active material or to supply electrons required for the electrochemical reaction. In general, the current collector is made of a metal such as copper or aluminum. Especially, when the current collector is made of a non-conductive polymer treated with a conductive material on the surface thereof or a conductive polymer, the current collector has a relatively higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), silver, palladium, nickel, etc. The conductive polymer may include polyacetylene, polyaniline, polypyrrole, polythiophene, polysulfurnitride, etc. However, the non-conductive polymer used for the current collector is not particularly limited to its kinds.

Meanwhile, the outer current collector of the present disclosure may be in the form of a mesh.

Such an outer current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube.

Meanwhile, the core 110 for supplying lithium ions comprises an electrolyte which is not particularly limited to its kinds and may be selected from a non-aqueous electrolyte solution using ethylene carbonate (EC), propylene carbonate (PC), butylenes carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc). Also, the electrolyte may further comprise a lithium salt which may be selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and a mixture thereof. The core 110 for supplying lithium ions may consist of only an electrolyte, and especially a liquid electrolyte may be formed by using a porous carrier.

In the present disclosure, the inner electrode may be an anode or a cathode, and the outer electrode may be a cathode or an anode corresponding to the inner electrode.

The electrode active material layers of the present disclosure allow ions to move through the current collector, and the movement of ions is caused by the interaction of ions such as intercalation/deintercalation of ions into and from the electrolyte layer.

Such electrode active material layers may be divided into an anode active material layer and a cathode active material layer.

Specifically, when the inner electrode is an anode and the outer electrode is a cathode, the inner electrode active material layer may comprise an anode active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof, and the outer electrode active material layer may comprise a cathode active material selected from the group consisting of LiCoO$_2$, LiNiO$_2$, LiMn$_2$O$_4$, LiCoPO$_4$, LiFePO$_4$, LiNiMnCoO$_2$, LiNi$_{1-x-y-z}$Co$_x$M1$_y$M2$_z$O$_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

Alternatively, when the inner electrode is a cathode and the outer electrode is an anode, the inner electrode active material layer becomes a cathode active material layer and the outer electrode active material layer becomes an anode active material layer.

An electrode active material layer generally comprises an electrode active material, a binder and a conductive material and is combined with a current collector to construct an electrode. When the electrode is subject to deformation, e.g., folding or severe bending by external forces, the electrode active material layer is released, thereby deteriorating battery performances and battery capacity. In contrast, in an electrode comprising the spirally wound sheet-form outer current collector of the present disclosure, such a deformation is less induced because the spirally wound sheet-form or mesh-form outer current collector has elasticity to disperse the external forces applied in the electrode. From this, the release of an active material can be prevented.

In the present disclosure, the separation layer may be an electrolyte layer or a separator.

The electrolyte layer serving as an ion channel may be made of a gel-type polymer electrolyte using PEO, PVdF, PVdF-HFP, PMMA, PAN or PVAc, or a solid electrolyte using PEO, polypropylene oxide (PPO), polyethylene imine (PEI), polyethylene sulfide (PES) or polyvinyl acetate (PVAc). The matrix of the solid electrolyte is preferably formed using a polymer or a ceramic glass as the backbone. In the case of typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a support to improve poor mechanical properties. The support may be a porous support or a cross-linked polymer. The electrolyte layer of the present invention can serve as a separator, and thus an additional separator may be omitted.

In the present disclosure, the electrolyte layer may further comprise a lithium salt. The lithium salt can improve an ionic conductivity and response time. Non-limiting examples of the lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate.

Examples of the separator may include, but is not limited to, a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; a porous substrate made of a mixture of inorganic particles and a binder polymer; or a separator having a porous coating layer formed on at least one surface of the porous polymer substrate and comprising inorganic particles and a binder polymer.

In the porous coating layer formed from inorganic particles and a binder polymer, the inorganic particles are bound to each other by the binder polymer (i.e., the binder polymer connects and immobilizes the inorganic particles), and also the porous coating layer maintains the state of binding with the first supporting layer by the binder polymer, In such a porous coating layer, the inorganic particles are filled in contact with each other, from which interstitial volumes are formed between the inorganic particles. The interstitial volumes between the inorganic particles become empty spaces to form pores.

Among these, in order for the lithium ions of the core for supplying lithium ions to be transferred to the outer electrode, it is preferred to use a non-woven fabric separator corresponding to the porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates.

Also, the cable-type secondary battery of the present disclosure has a protection coating 150, 250, 350. The protection coating acts as an insulator and is formed to surround the outer current collector, thereby protecting the electrodes against moisture in the air and external impacts. The protection coating 150, 250, 350 may be made of conventional polymer resins having a moisture-blocking layer. The moisture-blocking layer may be made of aluminum or a liquid-crystalline polymer which have good water-blocking ability, and the polymer resins may be PET, PVC, HDPE or epoxy resins.

Hereinafter, a cable-type secondary battery according to one embodiment of the present invention and the preparation thereof will be briefly explained with reference to FIG. 4.

A cable-type secondary battery 100 according to one embodiment of the present invention comprises a core 110 for supplying lithium ions, which comprises an electrolyte; an inner electrode having one or more wire-form inner current collectors 120 wound to surround the outer surface of the core 110 for supplying lithium ions and an inner electrode active material layer 130 formed on the surface of the wire-form inner current collectors 120; and a laminate 140 of separation layer-outer electrode, spirally wound to surround the outer surface of the inner electrode, the laminate being formed by carrying out compression for the integration of a separation layer for preventing a short circuit, and an outer electrode having an outer current collector and an outer electrode active material layer formed on one surface of the outer current collector.

First, the wire-form inner current collector 130 in which the inner electrode active material layer 120 is formed on the surface of the inner current collector is wound to obtain a hollow inner electrode whose central part is empty (S1).

The formation of the inner electrode active material layer 130 on the surface of the wire-form inner current collector 120 may be made by conventional coating methods, for example, by an electroplating process or an anodic oxidation process. Also, it is preferable to carry out coating methods in which an electrode slurry containing an active material is applied through a comma coater or a slot die coater. In addition, the electrode slurry containing an active material may be applied by way of dip coating or extrusion-coating using an extruder.

Subsequently, a sheet of a separation layer for preventing a short circuit and a sheet of an outer electrode having an outer current collector and an outer electrode active material layer formed on one surface of the outer current collector are compressed for their integration to obtain the laminate 140 of separation layer-outer electrode (S2).

The formation of the outer electrode active material layer on the surface of the outer current collector may be carried out by the same as the coating of the inner electrode active material layer. Specifically, the separation layer consisting of a polymer electrolyte layer is placed on the sheet of the outer electrode, followed by laminating by way of roll press, to obtain the laminate 140 of separation layer-outer electrode.

Next, the laminate 140 of separation layer-outer electrode is spirally wound on the outer surface of the inner electrode to obtain an electrode assembly (S3).

Then, the protection coating 150 is formed to surround the outer surface of the electrode assembly (S4).

The protection coating 150 acts as an insulator is formed on the outermost so as to protect the electrode against moisture in the air and external impact. The protection coating 150 may be made of a polymer resin having a moisture-blocking layer as mentioned above.

Subsequently, an electrolyte solution is introduced in the empty central part of the inner electrode to form the core 110 for supplying lithium ions (S5).

Thus, the core 110 for supplying lithium ions may be formed by carrying out the introduction of an electrolyte solution after the protection coating 150 is formed on the outer surface of the electrode assembly. Also, the core 110 may be formed in a wire form by introducing a polymer electrolyte using an extruder before forming the wound wire-form inner electrode, may be formed by providing a wire-form carrier made of a sponge material and introducing a non-aqueous electrolyte solution therein, or may be formed by introducing a non-aqueous electrolyte solution in the empty space of the inner electrode center after providing the inner electrode.

Finally, the introduction part of the electrolyte solution is completely sealed to prepare a cable-type secondary battery.

Hereinafter, another embodiment of the present disclosure will be described.

A cable-type secondary battery of this embodiment comprises two or more inner electrodes arranged in parallel to each other; and a sheet-form laminate of separation layer-outer electrode, spirally wound to surround the outer surface of the inner electrode, the laminate being formed by carrying out compression for the integration of a separation layer for preventing a short circuit, and an outer electrode.

Figure 9:
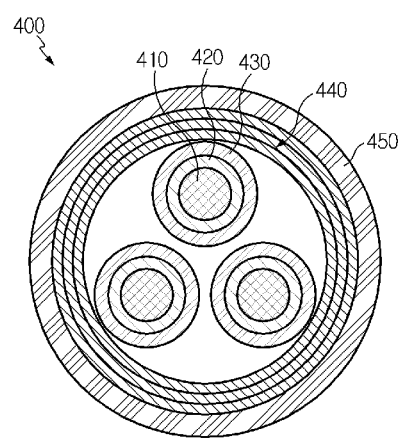
FIG. 9 shows a cross-section of a cable-type secondary battery having multiple inner electrodes according to the present disclosure.

Further, referring to FIG. 9, a cable-type secondary battery 400 according to another embodiment of the present invention comprises two or more cores 410 for supplying lithium ions, which comprise an electrolyte; two or more inner electrodes arranged in parallel to each other, each inner electrode having one or more wire-form inner current collectors 420 wound to surround the outer surface of each core 410 for supplying lithium ions and an inner electrode active material layer 430 formed on the surface of the wire-form inner current collectors 420; and a laminate 440 of separation layer-outer electrode, formed on the outer surface of the inner electrode, the laminate being formed by carrying out compression for the integration of a separation layer for preventing a short circuit, and an outer electrode having an outer current collector and an outer electrode active material layer formed on one surface of the outer current collector.

In the cable-type secondary battery 400 which has a plurality of inner electrodes, the number of the inner electrodes can be adjusted to control the loading amount of the electrode active material layers as well as battery capacity, and a probability of short circuit can be prevented owing to the presence of multiple electrodes.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

EXAMPLE 70 wt % of Graphite as an anode active material, 5 wt % of Denka black as a conductive material and 25 wt % of PVdF as a binder were mixed to obtain an anode active material-containing slurry. The slurry was coated on the outer surface of a wire-form Cu current collector having a diameter of 250 μm, to obtain a wire-form inner electrode having an anode active material layer.

Four wire-form inner electrodes obtained above were wound so that they are crossed with each other, to prepare a spring-type inner electrode whose center is empty, so a core for supplying lithium ions can be inserted therein.

Meanwhile, 80 wt % of $LiCoO_2$ as a cathode active material, 5 wt % of Denka black as a conductive material and 15 wt % of PVdF were mixed to obtain a cathode active material-containing slurry. The slurry was coated on an Al-foil and slit into a piece with a width of 2 mm, to obtain a sheet-form outer electrode.

Next, the sheet-form outer electrode was adhered with a sheet-form separator consisting of a porous substrate obtained from inorganic particles and a binder polymer, followed by lamination by using a roll press, to obtain a sheet-form laminate of the outer electrode and the separator being integrated by adhesion.

The laminate of the outer electrode and the separator thus obtained was wound on the outer surface of the inner electrode obtained above. Then, on the outer surface of the wound outer electrode, a heat-shrinkable tube having a moisture-blocking layer was applied and contracted with heat, to form a protection coating layer.

Then, a non-aqueous electrolyte solution (1M $LiPF_6$, EC:PC=1:1 (volume ratio)) was introduced in the center of the inner electrode using a syringe, to form a core for supplying lithium ions, followed by completely sealing. Thereby, a cable-type secondary battery was prepared.

Comparative Example

The procedures of Example 1 were repeated except that the separator is wound on the outer surface of the inner electrode and the sheet-form outer electrode was wound thereon, instead of the step of wining the laminate of the separator and the outer electrode on the outer surface of the inner electrode, to prepare a cable-type secondary battery.

Evaluation of Battery Performances

For the cable-type secondary batteries prepared in the Example and the Comparative Example, 100 cycles of charge/discharge processes were carried out with a current density of 0.2 C at a voltage condition of 4.2 to 3.0 V.

The capacity retention ratios of the batteries over cycles are shown in Table 1.

TABLE 1

| Battery | Capacity Retention Ratio After 50 Cycles | Capacity Retention Ratio After 100 Cycles |
| --- | --- | --- |
| Example | 88% | 85% |
| Comparative Example | 83% | 72% |

From Table 1, it was confirmed that the cable-type secondary battery of the Example exhibited an increase in rate retention ratio, i.e., superior life characteristics, as compared with the Comparative Example.

Meanwhile, the cable-type secondary batteries prepared in the Example and the Comparative Example were confirmed for their voltage profile to normal capacity.

Figure 10:
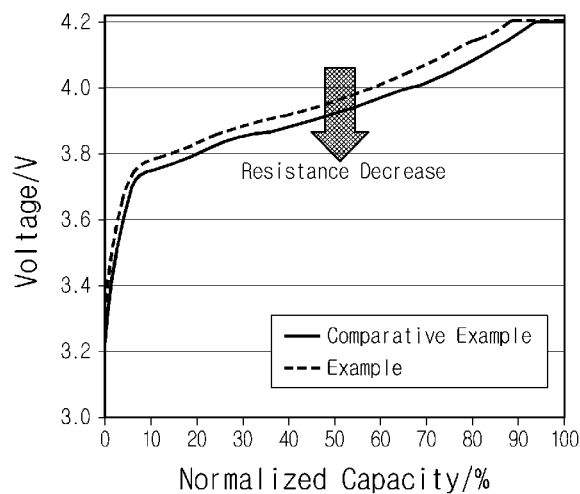
FIG. 10 is a graph showing a voltage profile to normal capacity during charging of cable-type secondary batteries prepared in the Example and the Comparative Example of the present disclosure.
Figure 11:
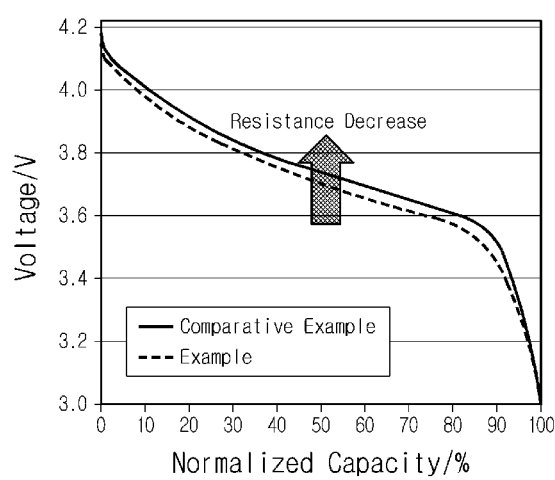
FIG. 11 is a graph showing a voltage profile to normal capacity during discharging of cable-type secondary batteries prepared in the Example and the Comparative Example of the present disclosure.

FIGS. 10 and 11 are each a graph showing a voltage profile to normal capacity during charging and discharging of cable-type secondary batteries prepared in the Example and the Comparative Example of the present disclosure. From these, it was confirmed that the cable-type secondary battery of the Example exhibited resistance decrease as compared with the Comparative Example.

According to the results above, a laminate of a separation layer and an electrode is applied in cable-type secondary batteries to minimize spaces between the electrode and the separation layer through integration, thereby improving the impregnation of an electrolyte solution into the micropores of the separation layer. From this, the resistance of the cable-type secondary batteries can decrease and the life characteristics thereof can be improved.

APPLICABILITY TO THE INDUSTRY

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A cable-type secondary battery, comprising:
   an inner electrode; and
   a sheet-form laminate of separation layer-outer electrode, helically wound to surround an outer surface of the inner electrode, the laminate being formed by carrying out compression for the integration of a separation layer for preventing a short circuit and an outer electrode,
   wherein the separation layer is an electrolyte layer or a separator.

2. The cable-type secondary battery according to claim 1, wherein the electrolyte layer comprises an electrolyte selected from a gel polymer electrolyte using PEO, PVdF, PMMA, PVdF-HFP, PAN, or PVAc; and a solid electrolyte using PEO, polypropylene oxide (PPO), polyether imine (PEI), polyethylene sulphide (PES), or polyvinyl acetate (PVAc).

3. The cable-type secondary battery according to claim 1, wherein the electrolyte layer further comprises a lithium salt.

4. The cable-type secondary battery according to claim 3, wherein the lithium salt is selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and a mixture thereof.

5. The cable-type secondary battery according to claim 1, wherein the separator is a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; a porous substrate made of a mixture of inorganic particles and a binder polymer; or a separator having a porous coating layer formed on at least one surface of the porous polymer substrate and comprising inorganic particles and a binder polymer.

6. The cable-type secondary battery according to claim 5, wherein the porous polymer substrate is a porous polymer film substrate or a porous non-woven fabric substrate.

7. A cable-type secondary battery, comprising:
   an inner electrode;
   a sheet-form laminate of separation layer-outer electrode, helically wound to surround an outer surface of the inner electrode, the laminate being formed by carrying out compression for the integration of a separation layer for preventing a short circuit and an outer electrode; and
   a protection coating surrounding an outer surface of the sheet-form laminate of separation layer-outer electrode.

8. The cable-type secondary battery according to claim 7, wherein the protection coating is made of a polymer resin.

9. The cable-type secondary battery according to claim 8, wherein the polymer resin comprises any one selected from the group consisting of PET, PVC, HDPE, an epoxy resin and a mixture thereof.

10. The cable-type secondary battery according to claim 8, wherein the protection coating further comprises a moisture-blocking layer.

11. The cable-type secondary battery according to claim 10, wherein the moisture-blocking layer is made of aluminum or a liquid-crystalline polymer.

12. A method of preparing a cable-type secondary battery, comprising
   (S1) winding a wire-form inner current collector together with an inner electrode active material layer formed on a surface of the inner current collector to obtain a hollow inner electrode whose central part is empty;
   (S2) compressing a sheet of a separation layer for preventing a short circuit with a sheet of an outer electrode having an outer current collector and an outer electrode active material layer formed on one surface of the outer current collector for the integration thereof to obtain a laminate of separation layer-outer electrode;
   (S3) helically winding the laminate of separation layer-outer electrode on an outer surface of the inner electrode to obtain an electrode assembly;
   (S4) forming a protection coating on an outer surface of the electrode assembly; and
   (S5) introducing an electrolyte solution in the empty central part of the inner electrode to form a core for supplying lithium ions.

13. A method of preparing a cable-type secondary battery, comprising
   (S1) forming a core for supplying lithium ions;
   (S2) winding a wire-form inner current collector together with an inner electrode active material layer formed on a surface of the inner current collector, on an outer surface of the core for supplying lithium ions, to obtain an inner electrode;
   (S3) compressing a sheet of a separation layer for preventing a short circuit with a sheet of an outer electrode having an outer current collector and an outer electrode active material layer formed on one surface of the outer current collector for the integration thereof to obtain a laminate of separation layer-outer electrode;
   (S4) helically winding the laminate of separation layer-outer electrode on an outer surface of the inner electrode to obtain an electrode assembly; and
   (S5) forming a protection coating on an outer surface of the electrode assembly.

\* \* \* \* \*